UNITED STATES PATENT OFFICE.

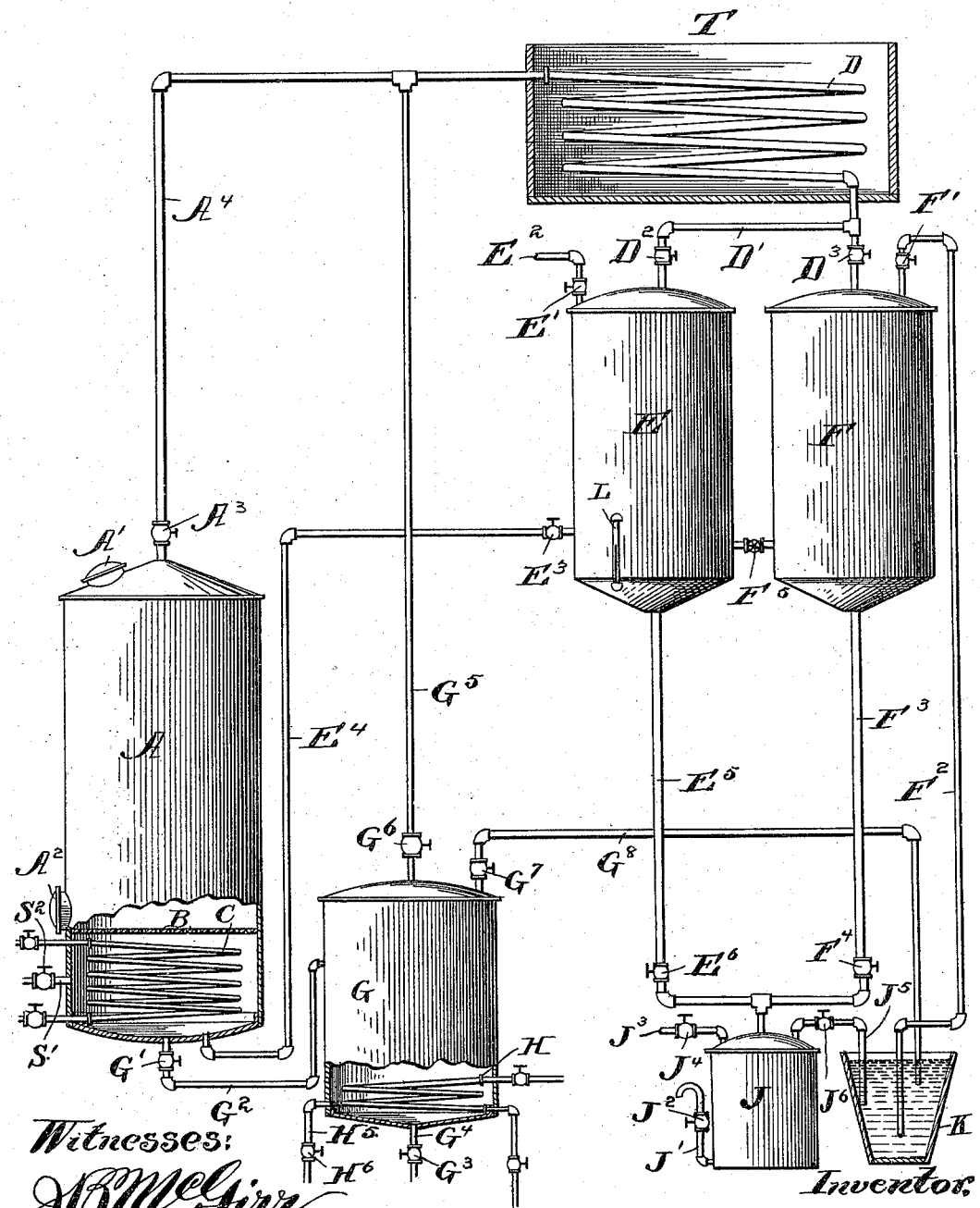

ADOLPH SCHWEIZER, OF CHICAGO, ILLINOIS, ASSIGNOR OF TWO-THIRDS TO WILLIAM F. JOBBINS AND MORRIS M. HIRSH, OF SAME PLACE.

PROCESS OF AND APPARATUS FOR EXTRACTING OIL.

SPECIFICATION forming part of Letters Patent No. 537,725, dated April 16, 1895.

Application filed March 21, 1894. Serial No. 504,547. (No model.)

*To all whom it may concern:*

Be it known that I, ADOLPH SCHWEIZER, a subject of the Emperor of Austria-Hungary, residing at Chicago, in the county of Cook and State of Illinois, have invented certain new and useful Improvements in Processes of Extracting Fats and Oils from Animal and Vegetable Substances; and I do hereby declare the following to be a full, clear, and exact description of the invention, which will enable others skilled in the art to which it appertains to make and use the same.

My invention relates to an improved process for extracting, *in vacuo*, fats and oils from animal and vegetable substances containing the same, such as bones, &c., and an apparatus therefor.

The objects of the invention are to separate from the animal and vegetable substances the water, and fats and oils within the same; to separate the fats and oils in a commercial form and to obtain after the operation a perfectly dry residuum.

The accompanying drawing represents a convenient form of apparatus for carrying out my process.

A, is a still provided with the usual man-holes $A'$, $A^2$. The joints of the man-holes are air-tight.

B, is a perforated grid or false bottom within the still.

C, is a steam coil within the still beneath the false bottom B.

D, is an ordinary condensing coil placed within a tank T, containing water.

E, and F, are solvent tanks.

G, is a grease tank for receiving the fats and oils obtained from the material.

H, is a steam coil within the grease tank.

J, is a separator, for separating from the water any of the solvent which may escape from the solvent tanks.

K, is a receptacle containing water.

The still A, is connected with the condenser D, by a pipe $A^4$ having a valve $A^3$ therein, and the condenser D, is connected with the solvent tanks E and F, by pipes $D'$, having valves $D^2$ and $D^3$ above the solvent tanks E and F, respectively. The solvent tank E, is connected with the separator J, by a pipe $E^5$ having a valve $E^6$; and the solvent tank F, is connected with the separator J, by a pipe $F^3$, having a valve $F^4$. The solvent tank F, is connected with the water receptacle K, by a pipe $F^2$, having a valve $F'$. The separator J, is connected with said water receptacle by a pipe $J^5$, having a valve $J^6$; and the grease tank G, is connected with said water receptacle K, by a pipe $G^8$, having a valve $G^7$. Said grease tank is also connected with the condenser D, by a pipe $G^5$, having a valve $G^6$, therein. The still A, is connected with the grease tank G, by a pipe $G^2$, having a valve $G'$, and with the solvent tank E, by a pipe $E^4$, having a valve $E^3$, therein. Live steam is to be admitted into the still A, at the proper time, through a live steam pipe $S'$, having a valve $S^2$.

In carrying out my process, it is necessary that a vacuum should be created in the solvent tank E, the grease tank G, and the separator J, and such vacuum may be conveniently produced by injecting live steam therein so as to fill the same; and which may then be allowed to condense. The live steam pipe for the solvent tank E, is $E^2$, having a valve $E'$. The live steam pipe for the grease tank G, is $H^5$, having a valve $H^6$, and the live steam pipe for the separator J, is the pipe $J^3$, having a valve $J^4$.

$J'$, is a pipe with a valve $J^2$ connected with the separator J, and through which the contents thereof may be removed, and $G^4$ is the draw off pipe from the grease tank G, having a valve $G^3$, therein, and by which the contents of the grease tank G, may be removed therefrom.

In carrying out my process, I make use of a fat solvent preferably liquid at ordinary temperatures and which may have a boiling point either below or above that of water, such as benzine and paraffin oil. This fat solvent, when of a boiling point higher than that of water, is placed in the solvent tank E, so as to entirely fill the same, excluding air therefrom, and this being done, and all the holes of the apparatus being closed, I proceed to carry out my process in detail as follows: The material which is to be treated is introduced into the still A, through the man-hole A' and rests on the perforated grid or false bottom B. The valves A³ and E³ are now opened and live steam is admitted into the solvent tank E, through the pipe E² to force the solvent into the still through the pipe E⁴. The valves E³ and E' are now closed and the steam within the solvent tank E, will condense and create a vacuum therein. The valve F' is now opened and steam is introduced into the steam coil C, to heat the solvent to a temperature above the boiling point of water but below that of the solvent. The high temperature of the solvent will convert into steam the water in the mixture to be treated and the steam rising in the still will force the remaining air therein out through the pipe A⁴, condenser D, solvent tank F, pipe F² and the water receptacle K. The steam and some solvent will condense in the condenser D, and will be deposited in the solvent tank F and the solvent in this tank will float to the surface of the water therein. The solvent tank F, should be sufficiently elevated above the water receptacle K, so as to prevent water from said receptacle from rising into the solvent tank by atmospheric pressure. After all air has been forced out of the still A, into the water receptacle K, which can be determined by the absence of bubbles in the water receptacle K, the valves F' and D³ are opened and the valve D² is opened, so that the still is connected directly with the solvent tank E, in both of which a vacuum will have been created, as explained. The steam in the steam coil C, being constantly maintained so as to heat the solvent almost to its boiling point, the steam and some solvent from the material pass through the condenser D, and being condensed, deposit in the solvent tank E, and the water being heavier than the solvent, sinks to the bottom of said solvent tank E, from which it may be discharged at intervals into the separator J. Should any of the solvent escape with this water into the separator J, the solvent will be separated therefrom in the latter and reclaimed for use. In order that this water may flow into the separator J, it will of course be obvious that a vacuum should be created in the latter, which may be done by introducing steam through the steam pipe J³ and allowing the said steam to condense, the air originally in the separator, being forced out of the same, by the steam, through the pipe J⁵. As soon as the condensed solvent in the solvent tank E, has reached the entrance of the pipe E⁴, which may be observed through the gage L, the valve E³ is opened and the solvent from the tank E is allowed to flow back into the still A, so that the operation will be continuous. As soon as the water has evaporated from the material within the still (which can be ascertained through the gage L when no further water deposits in the tank E) the steam is turned off in the steam coil C. The heating of the solvent by the steam coil C, during the operation of driving off water from the material, takes up from the material all the oils or fats therein, which will dissolve in the fat solvent. The valve G⁷ is now opened and live steam is introduced into the grease tank G, through the pipe H⁵. This live steam forces all air out of the grease tank G, into the water receptacle K, and this having been done, the said valves are closed and the steam in the grease tank is condensed so as to create a vacuum therein. The valve G' is now opened and the fatty solution from the still is drawn into the grease tank G, by the vacuum. The valves G' and A³ are now closed and the valve G⁶ is opened so as to connect the grease tank G, with the solvent tank E. Steam is now admitted into the steam coil H, so that the fatty solution will be heated to the boiling point of the solvent and the solvent in the grease tank will be vaporized, which vapor will be condensed in the condenser D, and will be deposited in the solvent tank E. The heat in the steam coil H, is now maintained until all of the solvent in the grease tank G has been vaporized out of the same and has been collected in the solvent tank E. Any waste solvent which may have been caught in the separator J, is now removed therefrom and deposited in the solvent tank E, and the solvent within the solvent tank F, is drawn into the solvent tank E, by the vacuum therein, through the pipe F⁵. Either prior to, or after these final operations of regaining the escaped solvent, live steam is admitted into the still through the pipe S' and passing through the solid desiccated residue on the grid B, will vaporize from the same all the solvent remaining therein, which solvent will be carried up and condensed in the condenser D and finally deposited in the solvent tank E. Since the temperature of this solid desiccated residue has been previously maintained above the boiling point of water there can be no condensation of steam in the still.

Having thus concluded the operation, I obtain in the still solid desiccated residue, which is perfectly dry and which can be conveniently used as a fertilizer, for the manufacture of glue, or other purposes, without the necessity of subsequent drying. This solid desiccated residue may be removed from the still A, through the man-hole A². I also obtain in the grease tank G, a clear fat or oil entirely free from solvent, and which may be removed from the grease tank through the pipe G⁴. I also obtain in the solvent tank E, all of the solvent used in the operation of my process, for future use. My process is therefore continuous and being carried out under vacuum, less heat will be required than in ordinary processes of extracting, with less danger of injuring or discoloring by decomposition the treated material, and the grease or oils obtained from the material. When a solvent is used having a boiling point below that of water the material is not submerged, as in this way desiccation simultaneously with the extraction of the fatty matter would be impracticable. When such volatile solvent is used, it should never be allowed to reach the grid. The temperature maintained is the boiling point of the solvent used and the vapors passing up through the material dissolve the fatty matter and also effect the desiccation of the material, the vacuum maintained materially facilitating the operation.

What I claim is—

1. In the art of extracting oil or fat from moist material containing the same, and simultaneously desiccating the material treated the improvement which consists in subjecting the material to the action of a heated solvent *in vacuo*, whereby the oils or fats will be dissolved therein and the moisture in the material will be expelled thereby as and for the purpose described.

2. In the art of extracting oil or fat from moist material containing the same, and simultaneously desiccating the material treated the improvement which consists in subjecting the material to the vapors of a solvent *in vacuo*, whereby the oils or fats will be dissolved therein and the moisture in the material will be expelled thereby as and for the purpose described.

3. In the art of extracting oil or fat from moist material containing the same, and simultaneously desiccating the material treated the improvement which consists in subjecting the material to the action of a heated solvent, whereby the oils or fats will be dissolved therein and the moisture in the material will be expelled thereby, and subsequently subjecting the material to the action of dry steam to expel the solvent remaining in the residue, all these operations being conducted *in vacuo*, as and for the purpose described.

4. In the art of extracting oil or fat from moist material containing the same, and simultaneously desiccating the material treated the improvement which consists in subjecting the material to the action of a heated solvent, whereby the oils or fats will be dissolved therein and the moisture in the material will be expelled thereby and subsequently subjecting the material to the action of dry steam to expel the solvent remaining in the residue, and distilling off the solvent from the separated fat or oil, all these operations being conducted *in vacuo*, as and for the purpose described.

5. In the art of recovering oil and fat from moist material containing the same, and simultaneously desiccating the material treated the improvement which consists in submerging the material in a fat solvent; heating the same *in vacuo* to evaporate off the water in the material; and separating the water from the distilled solvent, as and for the purpose described.

6. In the art of recovering oil and fat from moist material containing the same, and simultaneously desiccating the material treated the improvement which consists in submerging the material in a fat solvent, heating the same to boiling point *in vacuo* to extract the oily and fatty matters and to drive off water therefrom, as and for the purpose described.

7. In the art of recovering oil and fat from moist products containing the same, and simultaneously desiccating the material treated the improvement which consists in submerging the material in a fat solvent, heating the same to boiling point *in vacuo* to extract the oily and fatty matters therefrom and drive off water; distilling the fatty solution thus formed *in vacuo*, and finally subjecting the dry desiccated residue to a further heating to remove any solvent remaining therein, as and for the purpose set forth.

8. In the art of recovering oil and fat from moist material containing the same, and simultaneously desiccating the material treated the improvement which consists in placing the material to be treated in a still, submerging the material in a fat solvent, heating the solvent to boiling point to remove air from the still, creating a vacuum in the still; and finally subjecting the material to continued heating in such vacuum, as and for the purpose set forth.

9. In the art of recovering oils and fats from moist material containing the same, the improvement which consists in placing the material to be treated in a still, removing the air from the still and subjecting the material to the action of a solvent at boiling temperature *in vacuo* to effect simultaneous desiccation and extraction, as and for the purposes described.

10. In the art of recovering oils and fats from moist material containing the same, the improvement which consists in placing the material to be treated in a still, removing the air from the still, shutting off communication between the still and the atmosphere, and subjecting the material to the action of a solvent at boiling temperature in the vacuum thus produced to effect simultaneous desiccation and extraction, as and for the purposes set forth.

11. In the art of recovering oils and fats from moist material containing the same, the improvement which consists in placing the material to be treated in a still, removing the air from the still, subjecting the material to the action of a solvent at boiling temperature to effect simultaneous desiccation and extraction, transferring the fatty solution thus produced to a grease tank from which air has previously been excluded, distilling off the solvent from the fatty solution and condensing and collecting such solvent in a separate solvent tank from which air has been excluded, substantially as set forth.

12. In an apparatus for extracting oil or fat from moist material containing the same, the combination of the still A, means for heating the same; a condenser connected with said still; a solvent tank E, mounted above the still, and connected with said condenser and with the still; the grease tank G, connected with said condenser and with the still; and means for creating a vacuum in said solvent tank and said grease tank substantially as described.

13. In an apparatus for extracting oil and fat from moist material containing the same, the combination of the still A; means for heating the same; a condenser connected with said still; a solvent tank E, mounted above the still, and connected with said condenser and the still; a separator J, beneath the still, and connected with said solvent tank; the grease tank G, connected with said condenser and the still; and means for creating a vacuum in said solvent tank, said separator, and said grease tank, substantially as described.

14. In an apparatus for extracting oil and fat from moist material containing the same; the combination of the still A; means for heating the same; a condenser connected with the same; the solvent tanks E and F, connected together and with said condenser; a separator J, connected with said solvent tanks; connections between the solvent tank E, and the still; the grease tank G, connected with the condenser and the still; and means for creating a vacuum in the solvent tank E, the separator J, and the grease tank G, substantially as described.

15. In an apparatus for extracting oil and fat from moist material containing the same, the combination of the still A, means for heating the same; a condenser connected with the still; a solvent tank F, connected with the condenser and a water receptacle K, connected with said solvent tank, substantially as described.

This specification signed and witnessed the 1st day of March, 1894.

ADOLPH SCHWEIZER.

Witnesses:
ALFRED CONN,
O. M. HARRIS.